United States Patent [19]
Lenczyk et al.

[11] Patent Number: 6,060,553
[45] Date of Patent: May 9, 2000

[54] NON-AGGLOMERATING ELASTOMERIC PARTICLES

[75] Inventors: John P. Lenczyk; August H. Jorgensen, Jr.; Jayant R. Angal; Leland B. Kliever, all of Louisville, Ky.

[73] Assignee: Zeon Chemicals Incorporated, Louisville, Ky.

[21] Appl. No.: 08/954,472

[22] Filed: Oct. 20, 1997

Related U.S. Application Data

[63] Continuation-in-part of application No. 08/601,955, Feb. 15, 1996, abandoned.

[51] Int. Cl.[7] .............................. C08J 3/00; C08K 3/20; C08K 9/00; C08L 75/00
[52] U.S. Cl. ................... 524/507; 428/357; 428/407; 427/212; 427/213.3; 427/213.32; 427/213.36; 427/222; 523/201; 523/206; 524/322; 524/394; 525/123; 525/130; 525/455; 525/233; 525/234
[58] Field of Search .................................. 524/322, 394, 524/507; 525/233, 234, 123, 130, 455; 427/222, 212, 213.3, 213.32, 213.36; 428/407, 357; 523/201, 206

[56] References Cited

U.S. PATENT DOCUMENTS

| | | |
|---|---|---|
| 3,953,389 | 4/1976 | Holiday et al. . |
| 3,976,611 | 8/1976 | Aloia . |
| 4,027,067 | 5/1977 | Wagner et al. . |
| 4,119,759 | 10/1978 | Fischer et al. . |
| 4,269,740 | 5/1981 | Woods et al. . |
| 4,271,213 | 6/1981 | Grimm et al. . |
| 4,357,439 | 11/1982 | Blümel et al. . |
| 4,375,497 | 3/1983 | Sandstrom . |
| 4,383,108 | 5/1983 | Jorgensen, Jr. . |
| 4,622,193 | 11/1986 | Kresge et al. . |
| 5,202,371 | 4/1993 | Goetz et al. . |
| 5,322,731 | 6/1994 | Callahan, Jr. et al. . |
| 5,688,449 | 11/1997 | Fox ........................................ 264/54 |

FOREIGN PATENT DOCUMENTS

| | | |
|---|---|---|
| 1 452 080 | 10/1976 | United Kingdom . |
| WO 97/12695 | 4/1997 | WIPO . |

OTHER PUBLICATIONS

Patent Abstracts of Japan, vol. 008, No. 126 (C–228), Jun. 13, 1986 & JP59038206A, Mar. 2, 1986 (Abstract).
Database WPI Section Ch. Week 8049, XP002055950 & SU 729066A, Apr. 25, 1980 (Abstract).

*Primary Examiner*—Patrick D. Niland
*Attorney, Agent, or Firm*—Armstrong, Westerman, Hattori, McLeland & Naughton

[57] ABSTRACT

Elastomeric particles, which have a tendency to agglomerate, are rendered non-agglomerating by contacting those particles with an aqueous solution or dispersion of a polyurethane rubber, a high Mooney viscosity, high gel content rubber and/or a soap, and optionally a polar binder, separating the coated elastomeric particles from the solution or dispersion, and then drying the elastomeric particles while keeping the coated particles in motion.

35 Claims, No Drawings

NON-AGGLOMERATING ELASTOMERIC PARTICLES

This application is a continuation-in-part of application Ser. No. 08/601,955, filed Feb. 15, 1996 now abandoned.

The present invention relates to methods for producing non-agglomerating elastomeric particles and to the non-agglomerating elastomeric particles so produced.

BACKGROUND OF THE INVENTION

When certain elastomers are formed as pellets or crumbs, or are shredded or are ground into particles, the crumbs, shreds or particles have a tendency to fuse together and form agglomerates that are not readily friable. The formation of agglomerates is enhanced under the temperature conditions which are usually encountered during transportation, storage or processing of elastomeric particles. Agglomerates are difficult to process in conventional equipment for processing pulverulent resins when used alone or in combination with other materials.

Non-agglomerating elastomer-containing particles have been prepared by blending an elastomer with a crystalline or semi-crystalline non-elastomeric polymer, such as polyethylene, polypropylene or copolymers of ethylene and propylene. However, such pellets are not suitable for use in many elastomer applications because high levels of the non-elastomeric polymer are required.

Mineral powders, such as silica and talc, have been added to granulated elastomers to prevent the agglomeration of the elastomeric particles. These powders can be considered to function as flow control agents which serve to separate the elastomeric particles from each other. However, in order to prevent agglomeration, it is often necessary to add the powders in such large amounts that the powdered, pulverulent elastomer, when it is being processed, no longer exhibits the properties of the unpowdered elastomer. And since the additive employed to separate the elastomer particles is itself in the form of a fine powder, it separates in time from the larger elastomeric particles to form an undesirable, non-homogeneous dusty product. In addition to interfering with processing, the dust formed can present a health or safety risk when the particles are being processed.

Elastomeric particles have been treated by dusting with various organic materials, such as hydrocarbon waxes and powdered polyolefin resins. However, the treated particles eventually come together to form agglomerates because the waxes or resins which had covered the particles tend to separate from the particles. During storage, the separated wax or resin becomes concentrated at the bottom of the container containing the elastomeric particles forming an undesirable heterogenous product.

Elastomeric particles have been coated with various coating materials by heating the particles to a temperature which is higher than the melting point of the coating material, and then contacting the heated particles with the coating material in the form of a fine powder. Since the elastomeric particles are tacky, particularly when heated, it is difficult to coat the particles evenly and obtain a uniform product using such procedure.

Another approach to the problem of preventing agglomeration has been the coating of a dispersion of elastomeric particles with a latex of a vinyl resin. Using that approach, the elastomeric particles are first dispersed in an aqueous system and then are contacted with the latex of the non-elastomeric vinyl resin. However, particles containing high levels of a non-elastomeric polymer, or whose surfaces are rigid, may not be suitable for use in many applications requiring elastomeric particles.

There is a need for non-agglomerating elastomeric particles consisting predominately of the elastomer which can be fabricated into desirable products using conventional processing equipment, and a commercially feasible method for producing such particles.

Therefore, the primary objects of the present invention are to provide a) an improved method for preventing the agglomeration of elastomeric particles during storage and transport, b) improved non-agglomerating elastomeric particles and c) a convenient method for producing those improved non-agglomerating elastomeric particles.

SUMMARY OF THE INVENTION

We have discovered that particles of an elastomeric material, which have a tendency to agglomerate, can be prevented from agglomerating by coating those particles with a) a polyurethane rubber, b) a rubber having a high Mooney viscosity and a high gel content or c) a soap, using a solution or dispersion containing the polyurethane, the rubber and/or the soap.

In one method aspect, the present invention is a method for producing non-agglomerating elastomeric particles which comprises: contacting agglomerable elastomeric particles with an aqueous solution or dispersion of a polyurethane rubber, a rubber having a Mooney viscosity (ASTM test method D1646, large rotor, 100° C.) greater than 50 and a gel content (ASTM test method D3616, 0.4 gm rubber in 100 ml methyl ethyl ketone) greater than 60%, or a soap, to coat the agglomerable elastomeric particles with the polyurethane, the rubber or the soap; separating the coated particles from the solution or dispersion; and drying the coated particles keeping the coated particles in motion while they are being dried.

In its composition aspect, the present invention is the non-agglomerating elastomeric particles prepared by the above-described method.

In another method aspect, the present invention is a method for making particles of an agglomerable elastomer non-agglomerating which comprises: contacting the particles with an aqueous solution or dispersion of a polyurethane rubber, a rubber having a Mooney viscosity greater than 50 and a gel content greater than 60%, or a soap, to coat the particles with the polyurethane, the rubber or the soap; separating the coated particles from the solution or dispersion; and drying the coated particles keeping the coated particles in motion while they are being dried.

DETAILED DESCRIPTION OF THE INVENTION

The method of the present invention starts with elastomeric particles, which if otherwise untreated, would agglomerate during storage or in the interval between making the particles and processing the particles to form a finished product, or which would agglomerate prematurely during processing.

The method of the present invention is applicable to making a wide variety of elastomeric particles non-agglomerating and is particularly applicable to those particles where the elastomers are tacky or exhibit cold flow. Illustrative, non-limiting examples of elastomeric particles to which this invention may be applied are nitrile rubbers, hydrogenated nitrile rubbers, ethylene-propylene rubbers, copolymers of vinyl acetate and ethylene terpolymers of ethylene, propylene and a non-conjugated diene, natural rubbers, polybutadiene, polyisobutylene, butyl rubber, halogenated butyl rubber, copolymers of butadiene with one or more polymerizable ethylenically unsaturated monomers, such as styrene, acrylonitrile, methyl methacrylate, polyacrylates, polyethers and polymers of substituted butadienes, such as chlorobutadiene and isoprene.

The particle size of the elastomeric particles to be rendered non-agglomerating by the method of the present invention will vary in accordance with the end use for which they are designed. Particle size is not critical but will generally be in the range of about 1 to about 15 millimeters. Such particles are prepared by conventional procedures, for example, by pelletizing by cutting or tearing a bale of the elastomeric material into shreds or small pieces followed by chopping or grinding those shreds or small pieces into particles having the size desired. It is emphasized that the method of the present invention does not depend on the particular procedure utilized to prepare the elastomer and elastomeric particles, but as indicated above, is applicable to elastomeric particles which have a tendency to agglomerate. However, when practicing the present invention, it is preferable to start with particles having a smooth surface because less of the coating substance will be required to prevent the particles from agglomerating.

The aqueous dispersion used to coat the elastomeric particles generally contains 10–60% by weight of solids and may be of a polyurethane rubber. Polyurethane rubbers are prepared by the reaction of a slightly crosslinked polyester polyol, such as that prepared by the polycondensation of adipic acid, diethylene glycol and a small amount of a triol, or a polyether polyol, such as polyethylene glycol, with a diisocyanate, such as toluene diisocyanate, using procedures well known to those skilled in the art. Dispersions of polyurethane rubbers are most conveniently prepared by grinding the rubber into particles of colloidal size and dispersing the particles in an aqueous system containing a soap or other surfactant as the dispersing agent. Of particular interest in practicing the present invention are commercially available dispersions of self-curable polyurethanes, which contain residual unreacted functional groups and which can crosslink and cure the polyurethane rubber when the latex or dispersion containing it is dried.

The aqueous dispersion used to coat the elastomeric particles may be of a rubber having a Mooney viscosity greater than 50 and a gel content greater than 60%, which forms a non-brittle coating on the elastomeric particles. The aqueous dispersion may be a conventional latex, a soap solubilized latex, a dispersion made by emulsion polymerization or a dispersion made by grinding and suspending the rubber in a soap-containing aqueous system. The ground rubber may be dissolved in a hydrocarbon or other suitable solvent prior to being dispersed in the soap-containing aqueous system.

Dispersions or latices of nitrile rubbers are preferred. Nitrile rubbers are commercially available copolymers of butadiene and acrylonitrile containing about 5–60% by weight of the acrylonitrile and optionally a small amount of a third monomer. Nitrile rubber latices are most conveniently prepared by emulsion polymerization using conventional techniques, where the monomers are copolymerized in an aqueous medium in the presence of an emulsifying agent, such as soluble soap, and a free radical yielding initiator or catalyst.

The addition of a soap, or of additional soap, to the aqueous dispersion or latex used to coat the elastomeric particles further decreases the tendency of elastomeric particles to agglomerate. In addition, it has been discovered the use of a soap alone, i.e., no rubber in the dispersion, will also decrease, but to a lesser degree, the tendency of the particles to agglomerate. The efficacy of the soap to prevent agglomeration is enhanced when it is used together with a polar binder, such as polyethylene oxide, polyethylene glycol, poly(ethylene-vinyl acetate) or polyvinyl acetate.

The soaps useful in practicing the present invention are conventional soaps, or detergents, for example, ammonium salts, metal salts, such as the sodium, potassium, calcium and zinc salts, of fatty carboxyclic acids, such as lauric acid, stearic acid, abietic acid and the like. The soap may be a salt of mixed acids such as coconut or palm oil fatty acids, beef tallow fatty acids and rosin acids, and should have a melting point above the temperatures encountered during storage of the elastomeric particles and preferably above 50° C. Commercially available salts of acids such as lauric acid and stearic acid are generally preferred.

The elastomeric particles to be made non-agglomerating are contacted with a solution or dispersion of the rubber, and/of the soap, and optionally the polar binder, generally at room temperature (25° C). However, use of a solution or dispersion at a higher temperature, but below the softening or melting point of the elastomeric particles, the rubber and the soap, may be desirable. Contacting may be effected by adding the particles or an aqueous dispersion or latex containing the particles to a stirred dispersion containing the rubber and/or the soap, or vice versa, or spraying the solution or dispersion onto the particles. The rubber and/or the soap deposit on the surfaces of the elastomeric particles forming a thin rubber-like or flexible coating. The coated elastomeric particles are dried by conventional means, such as a hot air dryer at a temperature in the range of about 100° C. to about 150° C. and below the softening or melting point of the elastomer and the rubber. To prevent them from sticking together, the coated particles are kept in motion during drying, most conveniently by being suspended in a stream of hot air. The dried particles are then cooled or allowed to cool before being packaged or bagged.

Our invention is further illustrated by means of the following examples:

EXAMPLE 1

This example illustrate the beneficial effect of coating an elastomeric material with an aqueous dispersion or latex of a polyurethane rubber.

A bale of an elastomeric agglomerable nitrile rubber, an ungelled 67/33 copolymer of butadiene and acrylonitrile having a Mooney viscosity of about 50, was granulated into particles about 10 mm in diameter. The particles were contacted with an aqueous dispersion containing about 30% by weight of a self-curable polyurethane rubber and dried in a stream of warm air while keeping the particles in motion. Crosslinking or curing of the polyurethane occurred during the drying cycle. Essentially complete curing was obtained by heating at about 180 to 225° F. for three minutes or on standing for about two weeks at room temperature.

The dried particles were free-flowing and contained 0.44%, 1.44% and 3.54% by weight of the polyurethane coating. The particles, particularly those containing 1.44 and 3.54% of the polyurethane coating, were non-agglomerating when stored.

EXAMPLE 2

This example illustrate the beneficial effect of coating an agglomerable elastomeric material with aqueous dispersions or latices of a high Mooney viscosity and high gel content rubber.

The agglomerable elastomeric particles, a 67/33 ungelled copolymer of butadiene and acrylonitrile having a Mooney viscosity of 50 as in the previous example, were contacted with an aqueous dispersion or latex of a nitrile rubber. The coated particles were separated and dried, again keeping the particles in motion during drying.

The high Mooney viscosity and high gel content rubber in Runs B, D, E, F, G, H, I and L was a 60/40 a copolymer of butadiene and an acrylonitrile having a nitrile rubber Mooney viscosity of 120 and a gel content of 90%. The nitrile rubber in Runs C and M was a 67/33 butadiene-acrylonitrile copolymer having a Mooney viscosity of 80 and a gel content of 80%. In Runs D, E, H and I, the nitrile rubber was mixed with a 75/25 styrene-acrylonitrile copolymer. That copolymer was used alone in Runs J and K.

The coated particles were compaction tested under moderate pressure at room and elevated temperatures to simulate warehouse storage in a standard package. The initially free-flowing coated -particles, after compaction testing, were scored as follows:

1—completely fused together
2—can be broken apart by machine
3—can be broken apart by hand
4—fall apart when gently touched
5—free flowing as removed from container.

| Run No. | Coating Material | Amount of Coating (phr) | Compaction Test 50° C., 65 hours | Compaction Test 50° C., 4 days | Compaction Test 23° C., 7 days |
|---|---|---|---|---|---|
| A. | control | 0 | 1+ | 1+ | |
| B. | nitrile rubber | 3 | | 3 | |
| C. | nitrile rubber | 7 | | 3+ | |
| D. | nitrile rubber/ styrene-ACN resin | 2/1 | | 4 | |
| E. | nitrile rubber/ styrene-ACN resin | 4.7/2.3 | | 3 | |
| F. | nitrile rubber | 3 | | | 4 |
| G. | nitrile rubber | 7 | | | 4– |
| H. | nitrile rubber styrene /ACN | 2/1 | | | 4 |
| I. | nitrile rubber/ styrene-ACN | 4.7/2.3 | | | 3 |
| J. | styrene-ACN | 3 | | | 4 |
| K. | styrene-ACN | 5 | | | 4 |
| L. | nitrile rubber | 3 | 3 | | |
| M. | nitrile rubber | 7 | 3+ | | |

EXAMPLE 3

This example illustrates the further improvement obtained by adding a soap to aqueous dispersions of the type used in the previous example.

In all of the runs, the elastomeric particles were of an ungelled 67/33 copolymer of butadiene acrylonitrile having a Mooney viscosity of 50. In all runs, except Run N, the rubber coating material was a 60/40 copolymer of butadiene/acrylonitrile having a Mooney viscosity of 120 and a gel content of 90%. In Run N, the coating material was a 67/33 copolymer of butadiene/acrylonitrile having a Mooney viscosity of 80 and a gel content of 80%. The mixed salt was a mixture of sodium fatty acid salts.

| Run No. | Soap | Amount of Coating (phr) | Compaction Test 50° C., 4 days | Compaction Test 65 hrs, 50° C. |
|---|---|---|---|---|
| A. | control | 0 | 1+ | |
| B. | mixed salt | 3/.07 | 4+ | |
| C. | Na laurate | 1/1 | 4+ | |
| D. | Na laurate | 2/.5 | 3+ | |
| E. | Na laurate | 1/.5 | 4+ | |
| F. | Na laurate | .5/.5 | 4+ | |
| G. | Na laurate | .25/.25 | 3 | |
| H. | Zn stearate | .5/1 | 4 | |
| I. | Ca stearate | .4/1.6 | 4+ | |
| J. | Ca stearate | 1/1 | 3+ | |
| K. | Zn stearate | .4/1.6 | 4 | |
| L. | Zn stearate | .1/1 | 5– | |
| M. | Zn stearate | .5/1 | 4+ | |
| N. | Zn stearate | .5/1 | | 4 |

-continued

| Run No. | Soap | Amount of Coating (phr) | Compaction Test 50° C., 4 days | Compaction Test 65 hrs, 50° C. |
|---|---|---|---|---|
| O. | mixed salt | 3/.07 | | 4+ |
| P. | Na laurate | 1/1 | | 4+ |
| Q. | Na laurate | 2/.5 | | 3+ |
| R. | Na laurate | 1/.5 | | 4+ |
| S. | Na laurate | 1/1 | | 4+ |
| T. | Na laurate | .5/.5 | | 3 |

EXAMPLE 4

This example illustrates the results obtained when the elastomeric particles, the same as used in the previous examples, were coated with a dispersion or solution of a soap, not containing a polyurethane or other rubber. A more desirable appearance is obtained if the soap is melted by heating to its melting point after the particles have been coated and dried. Such heating does not adversely affect, and often improves, the ability of the elastomeric particles to resist agglomeration.

| Run No. | Coating Material | Amount of Coating (phr) | Compaction Test 50° C., 4 days | Compaction Test 50° C., 65 hrs |
|---|---|---|---|---|
| A. | control | 0 | 1+ | |
| B. | Ca stearate | 2 | 4 | |
| C. | Ca stearate | 2 | 4 | |
| D. | Na rosinate | 2.5 | 3+ | |
| E. | Zn stearate | 2 | 3+ | |
| F. | mixed salt | 2.5 | 3 | |
| G. | Na laurate | 2.5 | 3 | |
| H. | NH4 laurate | 2.5 | 3 | |
| I. | Ca stearate | 0.5 | 3 | |
| J. | Ca stearate | 2 | 4 | |
| K. | Ca stearate | 5 | 4+ | |
| L. | Zn stearate | 0.5 | 3 | |
| M. | Zn stearate | 2 | 4– | |
| N. | Zn stearate | 5 | | 4+ |
| O. | mixed salt | 3 | | 4+ |
| P. | Na laurate | 0.5 | | 3+ |
| Q. | Na laurate | 1.5 | | 3 |
| R. | Na laurate | 1.5 | | 3 |
| S. | Na laurate | 1.5 | | |

EXAMPLE 5

This example uses the procedure of the previous examples and illustrates the improvement obtained when an oxygen-containing binder is added to the solutions or dispersions containing a soap, a nitrile rubber, and both a soap and a nitrile rubber.

| Rum No. | Coating Material | Amount of Coating (phr) | Compaction Test 50° C., 4 days |
|---|---|---|---|
| A. | PEO/Zn stearate | .5/1 | 4+ |
| B. | PEO/Na stearate | 1/1 | 3 |
| C. | PEO/Na stearate | 1/5/1.5 | 3+ |
| D. | PEO/Na stearate | 2/2 | 3 |
| E. | PEO/Na stearate | 1/1 | 3– |
| F. | PEO/Na stearate | 2/2 | 3– |
| G. | NBR/EVA/Zn stearate | 0.5/3/0.2 | 4+ |
| H. | NBR/EVA/Zn stearate | 0.5/3/0.2 | 4– |
| I. | NBR/EVA | 0.5/3 | 4 |
| J. | NBR/ViAc/Zn stearate | 0.5/1 | 4 |

In the table, PEO designates polyethylene oxide, NBR designates a 60/40 copolymer of butadiene/acrylonitrile having a Mooney viscosity of 120 and a gel content of 90%, EVA designates poly(ethylene-vinyl acetate) and ViAc designates polyvinyl acetate. The binder, while not particularly effective when used alone, helps improve the integrity of the coating.

The elastomeric particles of the present invention, coated with 0.5–10% by weight and preferably 1–5% by weight of a polyurethane or nitrile rubber, are unique in that they are non-agglomerating even though they are coated with a rubbery material.

In summary, it has been found that elastomeric particles of natural and synthetic rubbers can be made free-flowing and remain free of agglomeration upon storage, shipping and handling, by treatment with a solution or dispersion of a rubber and/or a soap, and optionally a polar binder. The non-agglomerating elastomeric particles of the present invention can be used alone or in blends with other materials during molding and in making shaped articles using conventional processing equipment.

The present invention has been described in terms of its specific embodiments and non-limiting examples. Various modifications in the method of the present invention will be apparent to those skilled in the art and are included within the scope of the invention.

What is claimed is:

1. A method for producing non-agglomerating elastomeric particles which comprises:

contacting agglomerable elastomeric particles with an aqueous solution or dispersion of a) a self-curing polyurethane rubber, or b) a rubber having a Mooney viscosity greater than 50 and a gel content greater than 60%, to coat the agglomerable particles with the polyurethane rubber or the rubber having a Mooney viscosity greater than 50 and a gel content greater than 60%;

separating the coated particles from the solution or dispersion; and drying the coated particles keeping the coated particles in motion while they are being dried, wherein the agglomerable particles have a particle size of at least about 1 mm and are formed by reducing an elastomer in solid form into particles having a particle size smaller than said elastomer in solid form, and the polyurethane rubber or the rubber having a Mooney viscosity greater than 50 and a gel content greater than 60% forms a coating which is flexible.

2. A method according to claim 1, wherein the particles are coated with a rubber having a Mooney viscosity greater than 50 and a gel content greater than 60%.

3. A method according to claim 2, wherein the rubber is a nitrile rubber.

4. A method according to claim 1, wherein the particles are coated with a self-curing polyurethane rubber.

5. A method according to claim 1, wherein the particles are coated with a mixture of the polyurethane rubber or the rubber having a Mooney viscosity greater than 50 and a gel content greater than 60% and a soap.

6. A method according to claim 5, wherein the dried particles are heated to the melting point of the soap.

7. A method according to claim 1, wherein the solution or dispersion contains a polar binder.

8. A method according to claim 7, wherein the polar binder is polyethylene glycol, polyethylene oxide, poly(ethylene-vinyl acetate) or polyvinyl acetate.

9. Non-agglomerating particles of an agglomerable elastomeric material prepared by:

contacting particles of an agglomerable elastomeric material with an aqueous solution or dispersion of a) a self-curing polyurethane rubber, or b) a rubber having a Mooney viscosity greater than 50 and a gel content greater than 60% to coat the agglomerable particles with the polyurethane rubber or the rubber having a Mooney viscosity greater than 50 and a gel content greater than 60%;

separating the coated particles from the solution or dispersion; and drying the coated particles keeping the coated particles in motion while they are being dried, wherein the agglomerable particles have a particle size of at least about 1 mm and are formed by reducing an elastomer in solid form into particles having a particle size smaller than said elastomer in solid form, and the polyurethane rubber or the rubber having a Mooney viscosity greater than 50 and a gel content greater than 60% forms a coating which is flexible.

10. Non-agglomerating particles according to claim 9, wherein the particles are coated with a rubber having a Mooney viscosity greater than 50 and a gel content greater than 60%.

11. Non-agglomerating particles according to claim 10, wherein the rubber is a nitrile rubber.

12. Non-agglomerating particles according to claim 9, wherein the particles are coated with a self-curing polyurethane rubber.

13. Non-agglomerating particles according to claim 9, wherein the particles are coated with a mixture of the polyurethane rubber or the rubber having a Mooney viscosity greater than 50 and a gel content greater than 60% and a soap.

14. Non-agglomerating particles according to claim 13, wherein the dried particles are heated to the melting point of the soap.

15. Non-agglomerating particles according to claim 9, wherein the solution or dispersion contains a polar binder.

16. Non-agglomerating particles according to claim 15, wherein the polar binder is polyethylene glycol, polyethylene oxide, poly(ethylene-vinyl acetate) or polyvinyl acetate.

17. A method for making particles of an agglomerable elastomer non-agglomerating which comprises:

contacting the agglomerable particles with an aqueous solution or dispersion of a) a self-curing polyurethane rubber, or b) a rubber having a Mooney viscosity greater than 50 and a gel content greater than 60%, to coat the agglomerable particles with the polyurethane rubber or the rubber having a Mooney viscosity greater than 50 and a gel content greater than 60%;

separating the coated particles from the solution or dispersion; and drying the coated particles keeping the coated particles in motion while they are being dried, wherein the agglomerable particles have a particle size of at least about 1 mm and are formed by reducing an elastomer in solid form into particles having a particle size smaller than said elastomer in solid form, and the polyurethane rubber or the rubber having a Mooney viscosity greater than 50 and a gel content greater than 60% forms a coating which is flexible.

18. A method according to claim 17, wherein the particles are coated with a rubber having a Mooney viscosity greater than 50 and a gel content greater than 60%.

19. A method according to claim 18, wherein the rubber is a nitrile rubber.

20. A method according to claim 17, wherein the particles are coated with a self-curing polyurethane rubber.

21. A method according to claim 17, wherein the particles are coated with a mixture of the polyurethane rubber or the rubber having a Mooney viscosity greater than 50 and a gel content greater than 60% and a soap.

22. A method according to claim 21, wherein the dried particles are heated to the melting point of the soap.

23. A method according to claim 17, wherein the solution or dispersion contains a polar binder.

24. A method according to claim 23, wherein the polar binder is polyethylene glycol, polyethylene oxide poly(ethylene-vinyl acetate) or polyvinyl acetate.

25. A method according to claim 5, wherein the soap is an alkali metal, calcium or zinc salt of a fatty acid or abietic acid.

26. Non-agglomerating particles according to claim 13, wherein the soap is an alkali metal, calcium or zinc salt of a fatty acid or abietic acid.

27. A method according to claim 21, wherein the soap is an alkali metal, calcium or zinc salt of a fatty acid or abietic acid.

28. A method for producing non-agglomerating elastomeric particles which comprises:
   contacting agglomerable elastomeric particles with an aqueous solution or dispersion of (1) a soap and (2) a polar binder to coat the agglomerable particles with the soap and polar binder;
   separating the coated particles from the solution or dispersion; and
   drying the coated particles keeping the coated particles in motion while they are being dried, wherein the agglomerable particles have a particle size of at least about 1 mm and are formed by reducing an elastomer in solid form into particles having a particle size smaller than said elastomer in solid form, and the soap and polar binder form a coating which is flexible.

29. A method according to claim 28, wherein the soap is an alkali metal, calcium or zinc salt of a fatty acid or abietic acid.

30. A method according to claim 28, wherein the dried particles are heated to the melting point of the soap.

31. A method according to claim 28, wherein the polar binder is polyethylene glycol, polyethylene oxide, poly(ethylene-vinyl acetate) or polyvinyl acetate.

32. Non-agglomerating elastomeric particles of an agglomerable elastomeric material prepared by:
   contacting particles of an agglomerable elastomeric material with an aqueous solution or dispersion of (1) a soap and (2) a polar binder to coat the agglomerable particles with the soap and polar binder;
   separating the coated particles from the solution or dispersion; and
   drying the coated particles keeping the coated particles in motion while they are being dried, wherein the agglomerable particles have a particle size of at least about 1 mm and are formed by reducing an elastomer in solid form into particles having a particle size smaller than said elastomer in solid form, and the soap and polar binder form a coating which is flexible.

33. Non-agglomerating elastomeric particles according to claim 32, wherein the soap is an alkali metal, calcium or zinc salt of a fatty acid or abietic acid.

34. Non-agglomerating elastomeric particles according to claim 32, wherein the dried particles are heated to the melting point of the soap.

35. Non-agglomerating elastomeric particles according to claim 32, wherein the polar binder is polyethylene glycol, polyethylene oxide, poly(ethylene-vinyl acetate) or polyvinyl acetate.

* * * * *

UNITED STATES PATENT AND TRADEMARK OFFICE
CERTIFICATE OF CORRECTION

PATENT NO.:   6,060,553
DATED     :   May 9, 2000
INVENTOR(S):  LENCZYK et al.

It is certified that an error appears in the above-identified patent and that said Letters Patent is hereby corrected as shown below:

On the title page of the patent, change the assignee's name "Zeon Chemicals Incorporated" to --Zeon Chemicals L. P.--

Signed and Sealed this

Tenth Day of April, 2001

*Attest:*

NICHOLAS P. GODICI

*Attesting Officer*    *Acting Director of the United States Patent and Trademark Office*